July 1, 1952     C. B. DILLON     2,601,992
COLLAPSIBLE TRACTOR TOW BAR
Filed Feb. 18, 1949
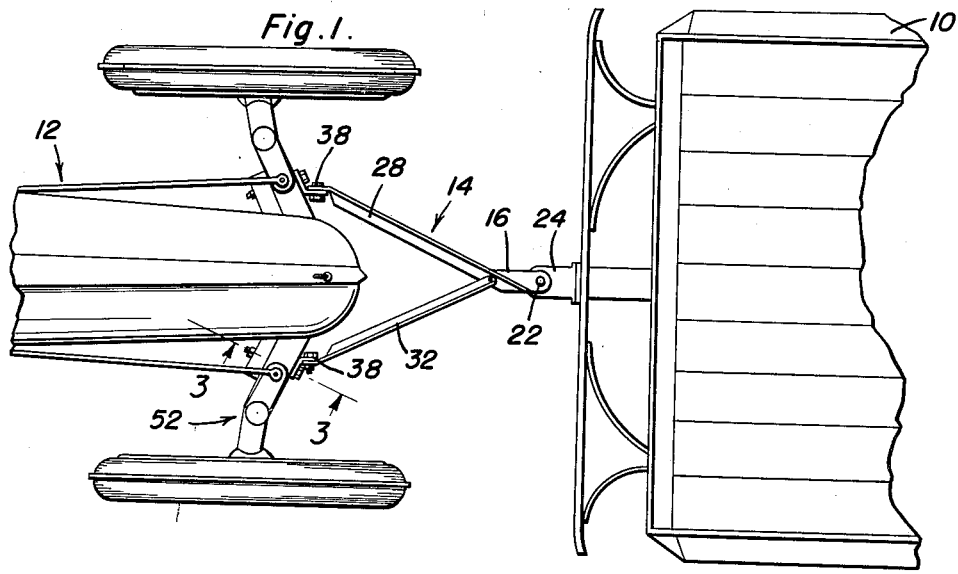
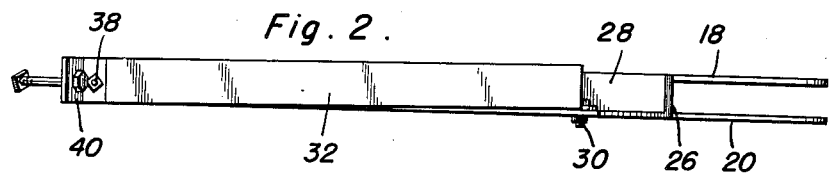
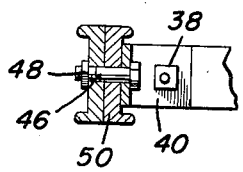
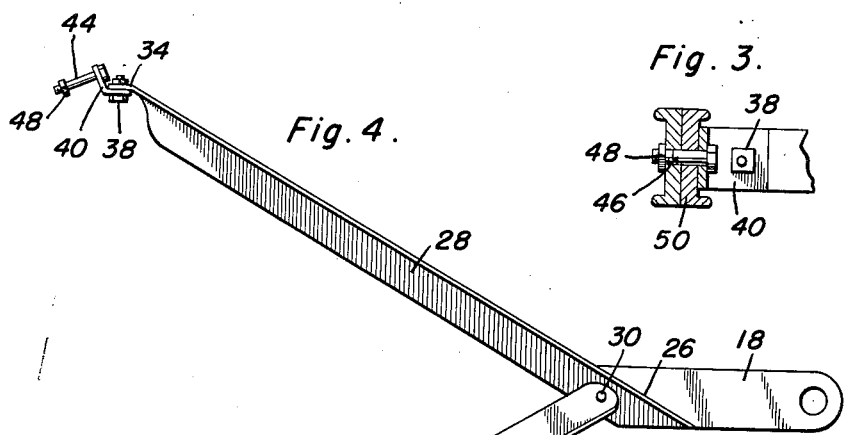
Inventor
Charles B. Dillon
By Clarence A. O'Brien
and Harvey B. Jacobson
Attorneys Patented July 1, 1952

2,601,992

UNITED STATES PATENT OFFICE 2,601,992

COLLAPSIBLE TRACTOR TOW BAR

Charles B. Dillon, Buda, Tex.

Application February 18, 1949, Serial No. 77,138

2 Claims. (Cl. 280—33.14)

This invention relates to a novel tow bar for attachment to a towing vehicle and a towed vehicle and especially adapted for towing Ford, Ford-Ferguson, and Ferguson tractors.

The primary object of this invention is to provide a tow bar which is simple in construction and which is foldable so that it can easily be carried in the car, truck or tractor and occupy little space when not in use.

A still further object of this invention is to provide a novel foldable tow bar which, because of its simplicity in construction and design, may be easily attached to or removed from both the towing and towed vehicle with a minimum of effort and manipulation.

A still further object of this invention is to provide a foldable vehicle towbar comprising a relatively short bar, means for attaching one end of said bar to a hitch of a towing vehicle, a first elongated bar secured to the free end of said short bar, a second elongated bar pivoted to said first elongated bar, and means for securing the free ends of said elongated bars to a chassis of a towed vehicle.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of the tow bar as attached to a towed and towing vehicle;

Figure 2 is a side elevational view thereof;

Figure 3 is a sectional view taken substantially in the plane of section 3—3 of Figure 1; and Figure 4 is an enlarged top plan view of the tow bar itself.

Specific reference is now made to the drawings. In the several views in the accompanying drawings and in the following specification reference characters indicate corresponding elements throughout.

Indicated generally at 10 is a towing vehicle such as a car, truck or tractor. Indicated at 12 is the towed vehicle which is preferably a Ford, Ford-Ferguson or Ferguson tractor. The novel tow bar attachment of the instant invention is indicated at 14.

The tow bar consists of an attaching element 16 which may be a single bar but which is preferably a pair of parallel bars 18 and 20 having apertures for pivotally receiving a pin 22 carried by the conventional hitch 24 secured to the rear of the towing vehicle 10. Welded or riveted to the bars 18 and 20 as at 26 is an elongated angle iron 28 which is preferably inclined outwardly with respect to the bars 18 and 20. Pivotally secured as at 30 to the elongated bar 28 and adjacent the free ends of the bars 18 and 20 is a further elongated bar 32.

The free ends of the vertical flanges of the bars 28 and 32 extend beyond the free ends of the horizontal flanges of the bars 28 and 32 to form extensions 34 and 36 respectively and secured to these extensions by means of appropriate bolts and screws 38 are angulated members or extensions 40 and 42 which are apertured to receive bolts 44 and 46 and nuts 48 for removably attaching the free ends of the bars 28 and 32 to the chassis of the towed vehicle 12. It is preferred that the bolts 44 and 46 extend through axles 50 secured to the chassis 52 of the towed vehicle, the axle being shown as an eye construction in Figure 3. It will be understood, of course, that the tow bar of the instant invention may be secured to any member of the chassis at the front of the towed vehicle 12 and when attached to the axle thereof is not limited to the construction of an eye axle necessarily.

Thus it will be seen that a novel tow bar is constructed wherein the elongated bar 32 is foldable upon the other elongated bar 28 so that the total tow bar can occupy a minimum of space and can be easily carried in the towing or towed vehicle when not in use.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A vehicle towing bar comprising first and second elongated angle iron bars facing each other and each having a horizontal flange and a vertical flange, said bars also having forward and rear ends, the rear end of the horizontal flange of one bar overlapping and being pivotally attached to the rear end of the horizontal flange of the other bar, whereby the horizontal flanges may be disposed one above the other with the vertical flanges spaced parallel to each other when the towing bar is in collapsed position, the forward ends of the horizontal flanges of both bars terminating short of their vertical flanges, whereby said vertical flanges will be provided with forward extensions, said forward extensions having angulated forward extremities disposed spaced parallel to each other, mounting brackets removably secured to said angulated extremities adapted for mounting the forward ends of the bars on a towing vehicle, and a horizontal coupling element fixedly secured to the rear end of the vertical flange of one of said bars and paralleling said forward extremities.

2. The combination of claim 1 wherein said mounting brackets each comprise an angle member, fasteners securing one flange of each angle member against said forward extremities, and additional fasteners extending through the other flanges of said angle members.

CHARLES B. DILLON.

REFERENCES CITED

The following references are of record in the file of this patent:

UNITED STATES PATENTS

| Number | Name | Date |
|---|---|---|
| 1,649,084 | Sandberg | Nov. 15, 1927 |
| 1,783,189 | Green | Dec. 2, 1930 |
| 2,340,273 | Phillips | Jan. 25, 1944 |

FOREIGN PATENTS

| Number | Country | Date |
|---|---|---|
| 577,987 | Germany | June 8, 1933 |